(12) United States Patent
Rahafrooz et al.

(10) Patent No.: US 10,082,394 B2
(45) Date of Patent: Sep. 25, 2018

(54) METHOD AND APPARATUS FOR ELECTROSTATIC MODE-ALIGNMENT ON PLANAR MEMS GYROSCOPES

(71) Applicant: Panasonic Corporation, Osaka (JP)

(72) Inventors: Amir Rahafrooz, Providence, RI (US); Diego Emilio Serrano, Peachtree City, GA (US); Ijaz Jafri, Holliston, MA (US)

(73) Assignee: PANASONIC CORPORATION, Osaka (JP)

( * ) Notice: Subject to any disclaimer, the term of this patent is extended or adjusted under 35 U.S.C. 154(b) by 185 days.

(21) Appl. No.: 15/169,033

(22) Filed: May 31, 2016

(65) Prior Publication Data

US 2016/0349055 A1     Dec. 1, 2016

Related U.S. Application Data

(60) Provisional application No. 62/169,306, filed on Jun. 1, 2015.

(51) Int. Cl.
*G01C 19/5684* (2012.01)
*G01C 19/5698* (2012.01)

(52) U.S. Cl.
CPC ..... *G01C 19/5698* (2013.01); *G01C 19/5684* (2013.01)

(58) Field of Classification Search
CPC ................ G01C 19/5684; G01C 19/5677
See application file for complete search history.

(56) References Cited

U.S. PATENT DOCUMENTS

| | | | |
|---|---|---|---|
| 7,023,065 B2 | 4/2006 | Ayazi et al. | |
| 7,543,496 B2 | 6/2009 | Ayazi et al. | |
| 7,578,189 B1 | 8/2009 | Mehregany | |
| 7,892,876 B2 | 2/2011 | Mehregany | |
| 8,166,816 B2 | 5/2012 | Ayazi et al. | |
| 8,173,470 B2 | 5/2012 | Mehregany | |
| 8,372,677 B2 | 2/2013 | Mehregany | |
| 8,528,404 B2 | 9/2013 | Ayazi | |
| 2012/0227487 A1 | 9/2012 | Ayazi et al. | |
| 2013/0283911 A1* | 10/2013 | Ayazi ................. | G01C 19/5684 73/504.12 |
| 2014/0230547 A1* | 8/2014 | El-Gamal .......... | G01C 19/5698 73/504.12 |
| 2014/0260611 A1* | 9/2014 | Johari-Galle ...... | G01C 19/5677 73/504.12 |

FOREIGN PATENT DOCUMENTS

WO     2015108989     7/2015

* cited by examiner

*Primary Examiner* — John Chapman, Jr.
(74) *Attorney, Agent, or Firm* — McDermott Will & Emery LLP

(57) ABSTRACT

A MEMS BAW vibratory planar gyroscope having an in-plane electrode configuration for mode-alignment by utilizing alignment electrodes that have a height less than a full height of the gyroscope resonant body. Such alignment electrodes apply a force component that affects modes with both in-plane and out-of-plane movements. The gyroscope includes a resonant body having a height and a perimeter surface and electrodes disposed adjacent the exterior perimeter surface of the resonant body. At least one of the electrodes is an alignment electrode and has a height less than the height of the resonant body.

25 Claims, 5 Drawing Sheets

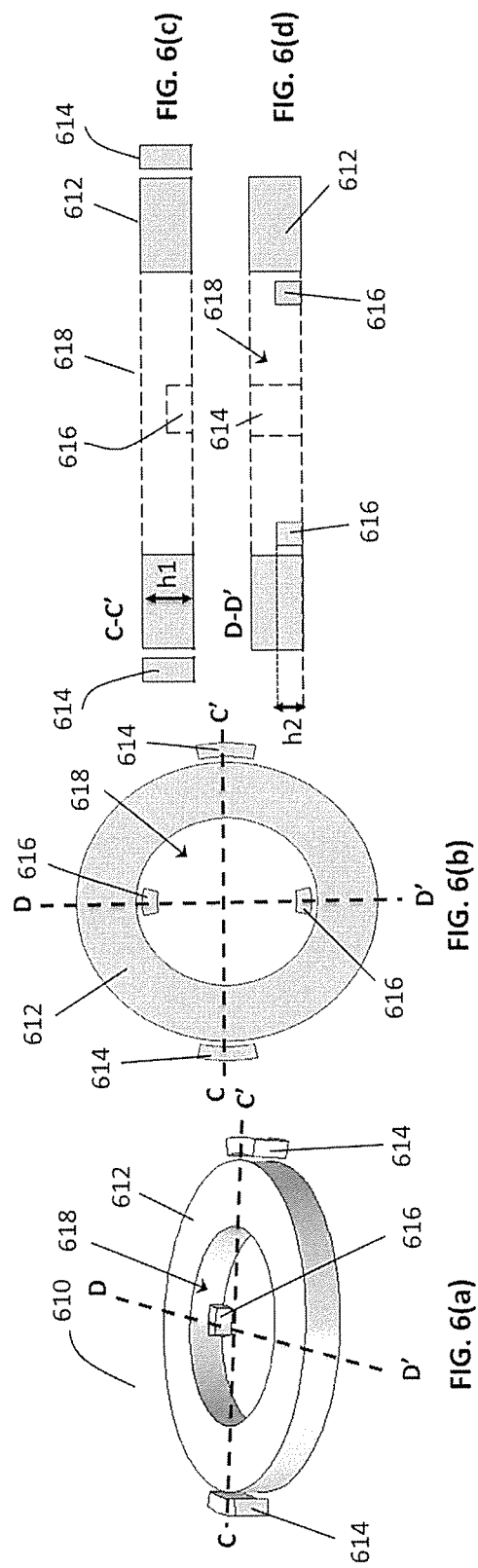

METHOD AND APPARATUS FOR ELECTROSTATIC MODE-ALIGNMENT ON PLANAR MEMS GYROSCOPES

CROSS-REFERENCE TO RELATED APPLICATION

This application claims priority of U.S. Provisional Patent Application Ser. No. 62/169,306 entitled "Method And Apparatus For Electrostatic Mode-Alignment On Planar MEMS Gyroscopes," filed Jun. 1, 2015.

FIELD OF THE DISCLOSURE

The disclosure relates to Microelectromechanical Systems (MEMS) devices, and, more specifically, to a system and technique for reducing quadrature error in a vibratory gyroscope.

BACKGROUND OF THE DISCLOSURE

Inertial measurement devices, such as gyroscopes and accelerometers, provide high-precision sensing, however, historically, their cost, size, and power requirements have prevented their widespread use in industries such as consumer products, gaming devices, automobiles, and handheld positioning systems.

More recently, MEMS devices, such as gyroscopes and accelerometers, have been gaining increased attention from multiple industries since micro-machining technologies have made fabrication of miniature gyroscopes and accelerometers possible. Miniaturization also enables integration of MEMS devices with readout electronics on the same die, resulting in reduced size, cost, and power consumption as well as improved resolution by reducing noise. Consumer products such as digital cameras, 3D gaming equipment, and automotive sensors are employing MEMS devices because of their numerous advantages. The demand for low cost, more sophisticated, and user-friendly devices by consumers has caused a steep rise in the demand of MEMS sensors, as they offer adequate reliability and performance at very low prices.

State-of-the-art MEMS devices, such as those disclosed in U.S. Pat. Nos. 7,578,189; 7,892,876; 8,173,470; 8,372,677; 8,528,404; 7,543,496; and 8,166,816, are able to sense rotational, i.e., angle or angular velocity of rotation around an axis, or translational motion, i.e., linear acceleration along an axis, around and along an axis. Techniques for manufacturing such devices using a process known as High Aspect Ratio Poly and Single Silicon (HARPSS) are disclosed in, for example, U.S. Pat. No. 7,023,065 entitled "Capacitive Resonators and Methods of Fabrication" by Ayazi, et al., and other publications.

As known, an imperfect MEMS gyroscope generates an undesired quadrature signal that is out of phase to the desired "rate" signal that indicates rotation about an axis. Such a quadrature error signal introduces an error component into the rate signal, leading to less than optimal output results from the MEMS gyroscope. In some instances, the quadrature error signal characteristics can overwhelm the rate signal generated by the MEMS gyroscope.

In vibratory gyroscopes, the quadrature error results from misalignment of the nodes and antinodes in the gyroscope's resonance modes with respect to pickoff electrodes. Misalignment of nodes and antinodes may occur due to crystalline misalignment and/or slanted sidewalls of the gyroscope's resonant member. As known, compensatory mechanisms must be utilized to precisely align the nodes and antinodes of the gyroscope's resonance modes to provide better performance with lower quadrature error/ZRO values. Such alignment can be done on a Z-axis gyroscope using electrostatic forces, however there has not been a mechanism to achieve such alignment with Bulk Acoustic Wave (BAW) vibratory planar gyroscopes.

In the case of BAW vibratory planar gyroscopes, among the operational resonance modes, there are modes with in-plane-only and out-of-plane-only movements. Such modes are not degenerate, making alignment difficult.

Accordingly, a need exists for an apparatus and technique to align the nodes and antinodes of the resonance modes of a BAW vibratory planar gyroscope.

SUMMARY OF THE DISCLOSURE

This application claims priority of U.S. Provisional Patent Application Ser. No. 62/169,306 entitled "Method And Apparatus For Electrostatic Mode-Alignment On Planar MEMS Gyroscopes," filed Jun. 1, 2015, the entire contents of which is hereby incorporated by reference for all purposes.

Disclosed herein is a novel in-plane electrode configuration that can be used for mode-alignment of planar gyroscopes, particularly BAW vibratory planar gyroscopes. According to one aspect of the disclosure, alignment of in-plane electrodes is achieved by utilizing alignment electrodes that have a height less than the full height of the gyroscope resonant body. Similar to tilted 45° electrodes, such electrodes can apply a force component along 45° to the gyroscope that can affect modes with both in-plane and out-of-plane movements. Optimal alignment can be achieved using half-height in-plane electrodes, however, smaller/larger heights can also be used.

According to one aspect of the disclosure, a MEMS gyroscope apparatus comprises a resonant body having a first height dimension value h1 and an exterior perimeter surface; and a plurality of electrodes disposed adjacent the exterior perimeter surface of the resonant body. At least one of the plurality of electrodes is an alignment electrode and has a second height dimension value h2 that is less than the first height dimension value h1 of the resonant body.

In another embodiment, multiple of the plurality of electrodes have a height dimension values less than the first height dimension value. In another embodiment, one or more of the alignment electrodes have a height dimension value which is approximately ½ of the first height dimension h1.

In still other embodiments, the resonant member has a vibratory mode characterized by in-plane mode anti-node locations and out-of-plane mode anti-node locations on the resonant member body and wherein the at least one alignment electrode is disposed at a location about the exterior perimeter of the resonant member where an in-plane mode antinode location and an out-of-plane mode anti-node location coincide.

According to one aspect of the disclosure, a MEMS gyroscope apparatus comprises a resonant body defined by a first height dimension value h1 and an exterior perimeter, the resonant body having a vibratory mode characterized by a plurality of in-plane mode anti-node locations and a plurality of out-of-plane mode anti-node locations on the resonant body; and at least one electrode disposed at a location about the exterior perimeter of the resonant body where an in-plane mode antinode location and an out-of-plane mode anti-node location coincide. In one embodiment, the at least one electrode is an alignment electrode and may have a height dimension value which is approximately ½ of the height dimension of the resonant member. In still other embodiments, multiple electrodes are disposed about the exterior perimeter of the resonant member body and have a height dimension value less than the height dimension of the resonant member.

According to yet another aspect of the disclosure, a method for making a MEMS apparatus comprises: forming a resonant body having a first height dimension value h1 and an exterior perimeter surface; and disposing at least one electrode adjacent the exterior perimeter surface of the resonant body. At least one of the electrodes is an alignment electrode and has a second height dimension value h2 that is less than the first height dimension value h1 of the resonant body. In one embodiment, a plurality of electrodes are formed adjacent the exterior perimeter surface of the resonant member, one or more of which may have height dimension value less than the height dimension of the resonant member.

According to another aspect, a gyroscope comprises a resonant body having a first height dimension value h1 and an exterior perimeter surface, the resonant body having a vibratory mode characterized by a plurality of in-plane mode anti-node locations and a plurality of out-of-plane mode anti-node locations on the resonant body; and an opening is defined in the resonant body. A first plurality of side electrodes is disposed adjacent the resonant body, each side electrode having a same height as the first height dimension value h1; and at least one alignment electrode is disposed adjacent the resonant body at a location where an in-plane mode antinode location and an out-of-plane mode anti-node location coincide. The at least one alignment electrode has a second height dimension value h2 that is less than the first height dimension value h1.

DESCRIPTION THE DRAWINGS

Various aspects of at least one embodiment of the present invention are discussed below with reference to the accompanying figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, not every component may be labeled in every drawing. The figures are provided for the purposes of illustration and explanation and are not intended as a definition of the limits of the invention. In the figures:

FIGS. 1(a) and 1(b) illustrate conceptually perspective and top views, respectively, of a MEMS gyroscope device in accordance with the disclosure;

Figure 4A:
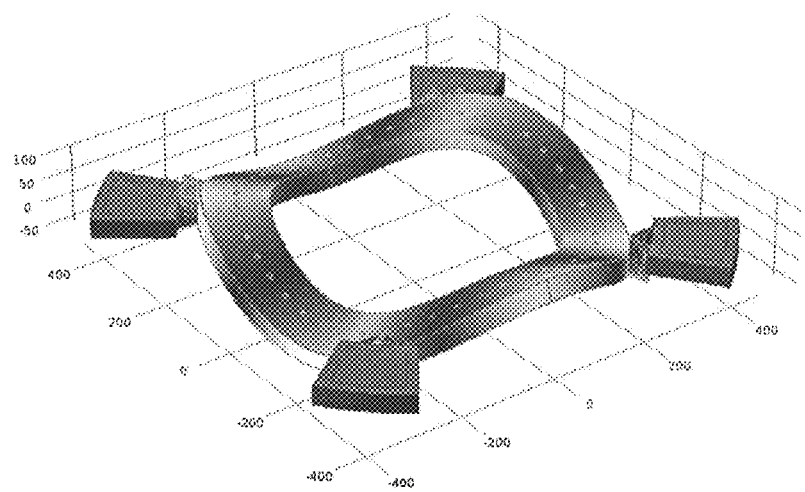
Figure 4B:
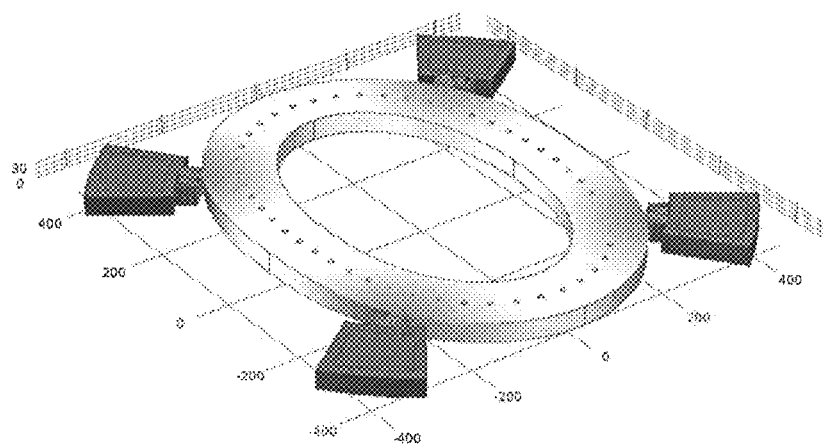
Figure 5A:
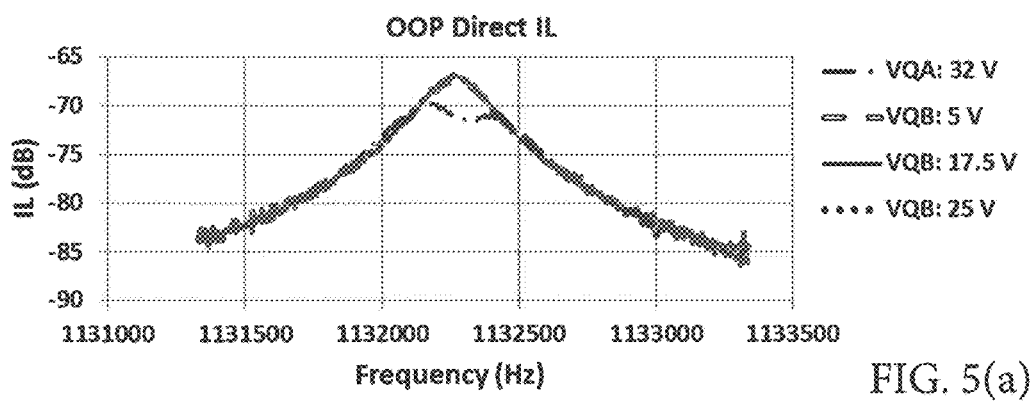
Figure 5B:
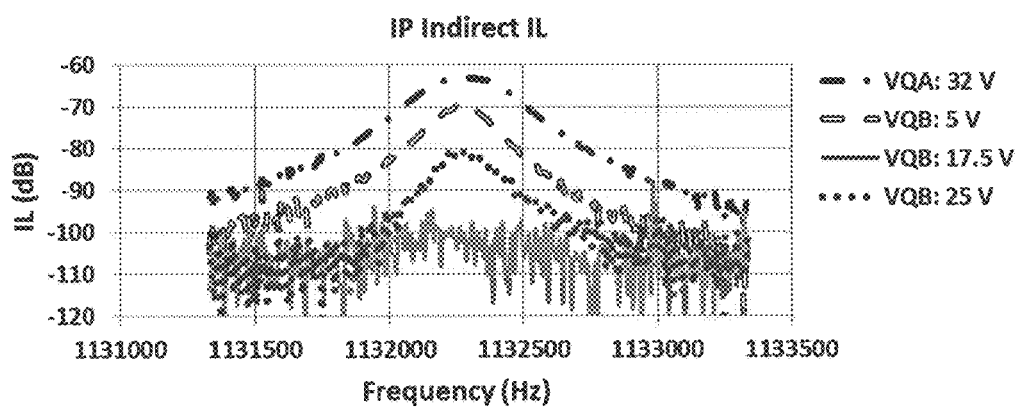
Figure 5C:
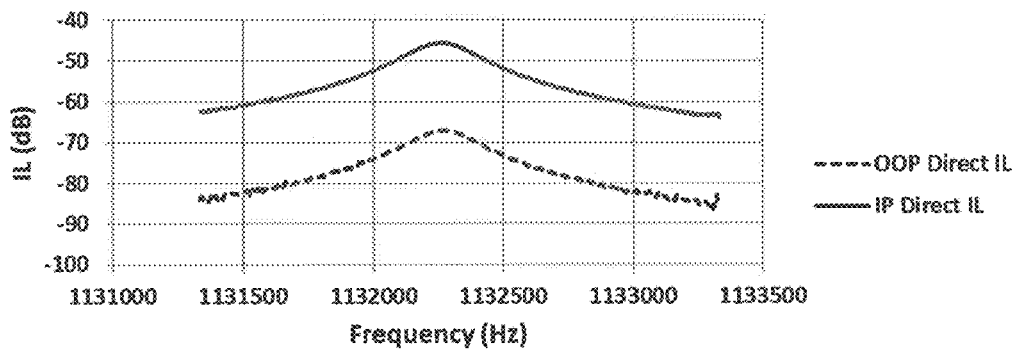

FIGS. 4(a) and 4(b) represent modal deformation of the in-plane and out-of-plane modes in a MEMS gyroscope device in accordance with the disclosure;

FIGS. 5(a)-5(c) represent frequency response of a MEMS gyroscope device in accordance with the disclosure;

FIGS. 6(a) and 6(b) illustrate conceptually perspective and top views, respectively, of a MEMS gyroscope device in accordance with another embodiment of the disclosure;

FIG. 6(c) illustrates conceptually a cross-sectional view of the MEMS gyroscope device of FIGS. 6(a) and 6(b), as viewed along line C-C' of FIGS. 6(a) and 6(b); and FIG. 6(d) illustrates conceptually a cross-sectional view of the MEMS gyroscope device of FIGS. 6(a) and 6(b), as viewed along line D-D' of FIGS. 6(a) and 6(b).

DETAILED DESCRIPTION

In the following detailed description, numerous specific details are set forth in order to provide a thorough understanding of the embodiments of the present invention. It will be understood by those of ordinary skill in the art that these embodiments of the present invention may be practiced without some of these specific details. In other instances, well-known methods, procedures, components and structures may not have been described in detail so as not to obscure the embodiments of the present invention.

Prior to explaining at least one embodiment of the present invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein are for the purpose of description only and should not be regarded as limiting.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Technologies disclosed herein are directed towards sensing rotation and acceleration around all three axes of free space using an inertial measurement MEMS device. Such devices may have six degrees of freedom in their mechanical design to be able to sense six independent motion signals, i.e., linear acceleration along, and angular velocity signals around, three orthogonal axes of free space. The manufacturing techniques and designs disclosed herein may be used with any number of commercially available MEMS gyroscopes including those disclosed in the previously mentioned U.S. Pat. No. 7,023,065 and U.S. Patent Publication 2012/0227487, where the subject matter of each is incorporated herein by reference for all purposes.

It was determined that in order to address the deficiencies of known approaches to align the nodes and anti-nodes, an electrode configuration that can affect resonance modes with both in-plane-only movements and out-of-plane-only movements was needed. Based on a theoretical analysis, i.e., finite element analysis modeling, however, on optimal location for placing the alignment electrodes on a BAW vibratory planar gyroscope calls for a tilted angle electrode with a 45° angle where the antinodes of the two resonance modes coincide.

Such an electrode can apply an electrostatic force at 45° simultaneously affecting both modes. Unfortunately, the ideal 45° configuration is impractical from a fabrication point of view. However, a 54.7° electrode can be achieved through wet-etching of <100> single-crystalline silicon but still requires a very complex fabrication process. As described below, a new alignment electrode that can significantly simplify the fabrication process and make it manufacturable is provided.

Advantageously, as presented below, as the out-of-plane mode has some torsion to it, its displacement cannot be sensed using a full-height in-plane electrode but can be fully picked-off using a half-height in-plane electrode.

Referring to FIG. 1(a), a gyroscope/resonator 10 includes a resonant body 12 with pairs of electrodes 14 and 16. In one embodiment, resonant body 12 is defined by a generally circular exterior perimeter surface and a thickness or height dimension, h1 (shown in FIG. 1(c)) with an opening 18 in its center. Resonant body 12 may be made of single crystalline silicon or poly-silicon and fabricated using the HARPSS manufacturing process as disclosed in U.S. Pat. No. 7,023,065. Electrodes 14 and 16 may be made of single crystalline silicon or poly-crystalline silicon and also fabricated using the HARPSS manufacturing process.

Side electrodes 14, as shown in FIG. 1(c), i.e., viewed along cross-sectional line A-A' of FIGS. 1(a) and 1(b), also have a height dimension substantially equivalent to height dimension h1 of the resonant body 12. Alignment electrodes 16, as shown in FIG. 1(d), i.e., viewed along cross-sectional line B-B' of FIGS. 1(a) and 1(b), have a height dimension h2 that is less than the height dimension h1 of the resonant body 12, i.e., h2<h1. In one embodiment, alignment electrodes 16 have a height dimension value h2 of approximately one half of the height dimension h1 of the resonant body 12, i.e., h2≈0.5*h1.

Figure 1:
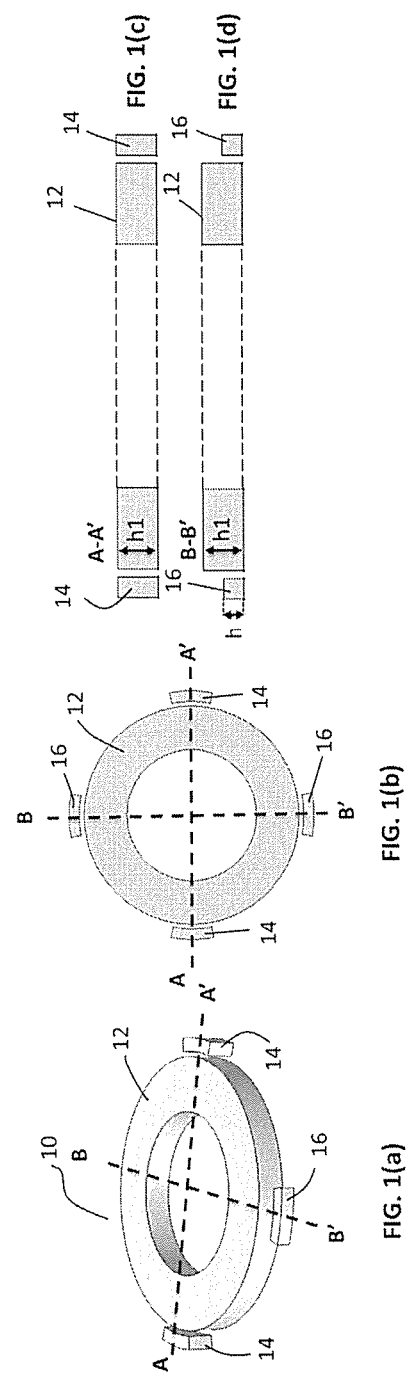
FIG. 1(c) illustrates conceptually a cross-sectional view of the MEMS gyroscope device of FIGS. 1(a) and 1(b), as viewed along line A-A' of FIGS. 1(a) and 1(b), in accordance with the disclosure.
FIG. 1(d) illustrates conceptually a cross-sectional view of the MEMS gyroscope device of FIGS. 1(a) and 1(b), as viewed along line B-B' of FIGS. 1(a) and 1(b), in accordance with the disclosure.

According to one aspect of the disclosure, alignment of in-plane electrodes is achieved by utilizing a pair of alignment electrodes 16 that have a height h2 less than the full height h1 of the gyroscope resonant body 12, as illustrated in FIG. 1 (d). In one embodiment, alignment electrodes 16 have a height dimension value h2 in the range of approximately 20% to 80% of the height dimension h1 of the resonant body 12. In another embodiment, alignment electrodes 16 have a height dimension value h2 in the range of approximately 40% to 60% of the height dimension h1 of the resonant body 12. In still another embodiment, alignment electrodes 16 may have a height dimension value h2 in the range of approximately 45% to 55% of the height dimension h1 of the resonant body 12. In one embodiment, optimal alignment can be achieved using half-height, in-plane electrodes. In-plane electrodes 14, as illustrated in FIG. 1(c), that are the same height as the resonant body 12, affect only the modes with in-plane movements while out-of-plane electrodes 16 affect only the modes with out-of-plane displacements.

Figure 2:
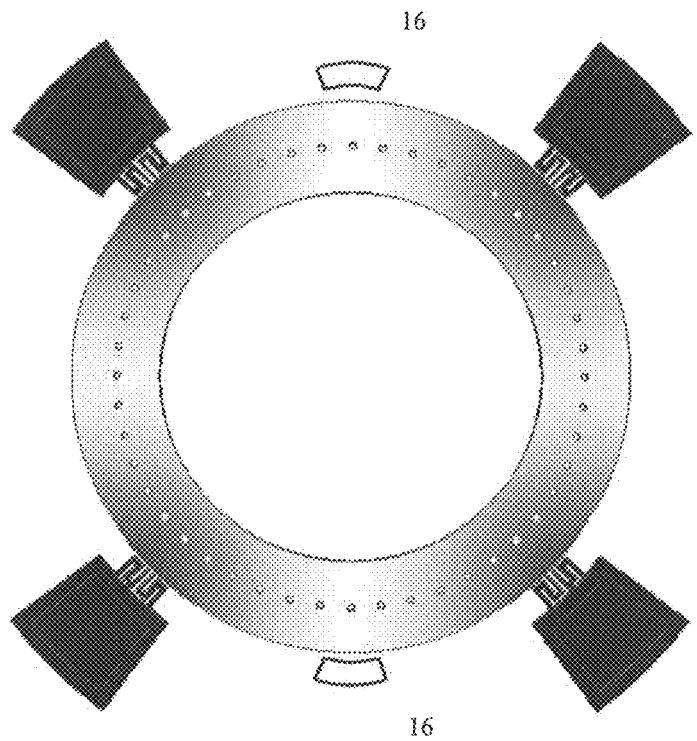
FIG. 2 illustrates conceptually a top view of a MEMS gyroscope device in accordance with the disclosure.

In one embodiment, in order to align each out-of-plane mode with respect to the in-plane mode, two alignment electrodes 16 are utilized. To provide maximum alignment, the alignment electrodes 16 may be placed where the antinodes of the out-of-plane mode and in-plane mode coincide, as illustrated in FIG. 2. In a dual-axis planar gyroscope, four alignment electrodes 16 may be utilized. An alignment electrode 16 has a height dimension h2 less than the height dimension h1 of the resonant body 12 and needs to be located where the antinodes of the in-plane and out-of-plane mode coincide to provide the maximum alignment. A side electrode 14 is to only affect the in-plane mode and will have the maximum performance if it is placed at the antinode of the in-plane mode and has the same height as the resonant body 12.

Figure 3:
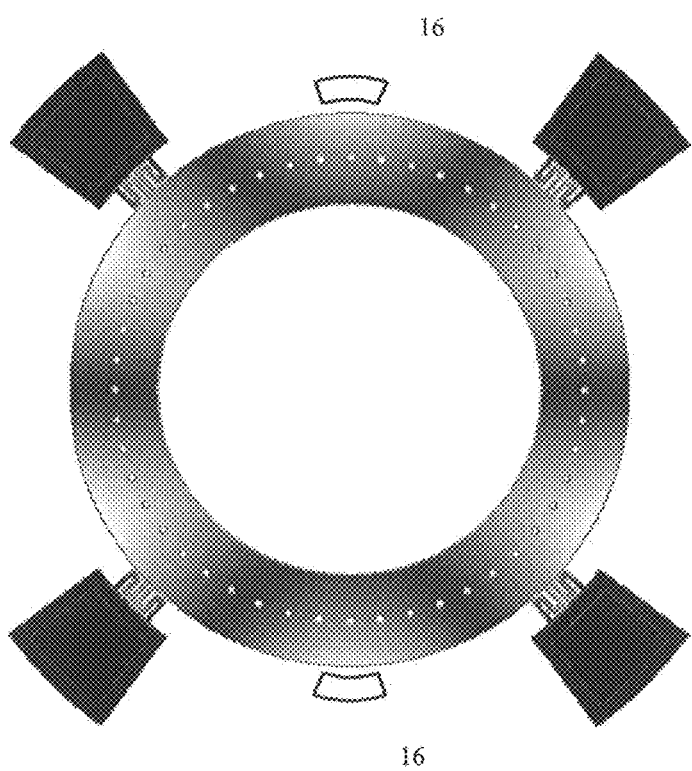
FIG. 3 illustrates conceptually a top view of a MEMS gyroscope device in accordance with the disclosure.

In a single-axis planar gyroscope, assuming: 1) that the unwanted out-of-plane mode is displaced using electrostatic forces and/or 2) the exterior perimeter of the resonant body 12 is circular or oval-shaped, two alignment electrodes 16 are sufficient to align the gyroscope, as illustrated in FIGS. 2 and 3.

Thus, referring to FIG. 2, the shading represents the displacement profile on the out-of-plane mode, with black and white representing the minimum and maximum displacements, respectively. The same shading scheme in FIG. 3 shows the displacement on the in-plane mode. Together, FIGS. 2 and 3 represent alignment electrodes 16 placed where the antinode coincide, i.e., where the maximum displacement on the in-plane and out-of-plane modes coincide.

Displacing the unwanted out-of-plane mode using electrostatic forces is described in U.S. Pat. No. 8,763,441 to Giorgio Casinovi, et al., entitled "Method and Apparatus for Self-Calibration of Gyroscopes," and a resonant body with an oval perimeter is described in International Application No. PCT/US15/11416, published as WO 2015/108989, by Diego Serrano, et al., and entitled "MEMS Apparatus With Intentional Geometrical Imperfections For Alignment Of Resonant Modes And To Compensate For Manufacturing Variations," the subject matter of each of which is incorporated by reference herein for all purposes.

It should be noted that, although the resonant body 12 is shown in this embodiment as being circular, it could also be oval, or cubic, for example. Further, the intentional geometrical imperfections are not limited to the "exterior perimeter" but can be applied to different parts of the resonant body 12. In addition, regardless of the shape of resonant body 12, the methods taught here can be used in any planar gyroscope that has in-plane and out-of-plane modes.

Advantageously, the alignment electrode 16 configurations disclosed herein may be utilized to compensate for misalignment due to both crystalline misalignment and slanted sidewall configurations in resonant body 12.

The disclosed alignment electrode 16 configuration was successfully implemented and characterized on a single-axis planar gyroscope. The unwanted out-of-plane mode was pushed away by inducing an ovalness to the exterior perimeter of the resonant body 12 and therefore only two alignment electrodes 16 were utilized. The fabricated gyroscope was operated in an open-loop configuration. The out-of-plane mode, as shown in FIG. 4(a), was driven into vibration and the frequency response of the out-of-plane mode was captured and is labeled as "Direct IL" (Direct Insertion Loss) in FIG. 5(a). Similar to FIGS. 2 and 3 above, the overall displacement is portrayed with black and white representing the minimum and maximum displacements, respectively. The frequency response of the in-plane mode to out-of-plane drive was also picked off using full-height side electrodes 14 that represents the quadrature signal and is labeled as "IP Indirect IL" in FIG. 5(b). The potentials on two alignment electrodes 16 (labeled as VQA & VQB in FIGS. 5(a) and 5(b)) were adjusted to completely cancel the quadrature while side electrodes 14 of height h1 were used to keep the resonance frequency of the in-plane and out-of-plane modes equal providing a mode-aligned and mode-matched gyroscope.

In this example, the resonant body 12 is biased at a polarization voltage of 35 V, and FIG. 5(b) represents how the quadrature signal is affected by changing the potential on one of the alignment electrodes VQA/VQB 16 while the other one is kept at 35 V. The frequency response of the out-of-plane and in-plane (FIG. 4 (*b*)) modes when driven in-plane and out-of-plane, respectively, shows that the gyroscope is mode-matched as is presented in FIG. 5(*c*).

In another embodiment of the present invention, referring now to FIGS. 6(*a*)-6(*d*), a gyroscope/resonator 610 includes a resonant body 612 that, in one example, is defined by a generally circular exterior perimeter surface and a thickness or height dimension, h1 (shown in FIG. 6(*c*)). A generally circular opening 618 is defined in its center. Resonant body 612 may be made in a manner similar to the embodiment described above with respect to FIGS. 1(*a*)-1(*d*). Side electrodes 614 are disposed at the exterior perimeter of the resonant body 612 and alignment electrodes 616 are disposed in the opening 618. The side and alignment electrodes may be made as described above.

Side electrodes 614, as shown in FIG. 6(*c*), i.e., viewed along cross-sectional line C-C' of FIGS. 6(*a*) and 6(*b*), have a height dimension substantially equivalent to height dimension h1 of the resonant body 12. Alignment electrodes 16, as shown in FIG. 6(*d*), i.e., viewed along cross-sectional line D-D' of FIGS. 6(*a*) and 6(*b*), have a height dimension h2 that is less than the height dimension h1 of the resonant body 12, i.e., h2<h1. In one embodiment, alignment electrodes 616 have a height dimension value h2 of approximately one half of the height dimension h1 of the resonant body 12, i.e., h2≈0.5*h1 and may have a height h2 as has been described above with respect to h1.

In one embodiment, optimal alignment can be achieved using half-height, in-plane electrodes. In-plane electrodes 614, as illustrated in FIG. 6(*c*), that are the same height as the resonant body 612, affect only the modes with in-plane movements while out-of-plane electrodes 616 affect only the modes with out-of-plane displacements.

It should be noted that the side electrodes 14, 614 can also be placed within the opening 18, 618 in the respective embodiments described above in accordance with the above teachings.

The present disclosure was successfully demonstrated for a mode-aligned and mode-matched BAW vibratory planar gyroscope, however, the same concepts can be applied to other mode-matched or mode-split vibratory planar gyroscopes.

The reader will appreciate that the apparatus and systems disclosed herein may be used to align planar gyroscopes, thereby reducing the quadrature errors and enabling larger drive amplitudes, for better performance and higher yields.

The present disclosure is illustratively described above in reference to the disclosed embodiments and it is to be understood that these are provided for illustration are in no way intended to be considered limiting. Various modifications and changes may be made to the disclosed embodiments by persons skilled in the art without departing from the scope of the present disclosure as defined in the appended claims.

What is claimed is:

1. An apparatus comprising:
   a resonant body having a first height dimension value h1 and an exterior perimeter surface; and
   a plurality of electrodes disposed adjacent the exterior perimeter surface of the resonant body,
   wherein at least one of the plurality of electrodes is an alignment electrode and has a second height dimension value h2 that is less than the first height dimension value h1 of the resonant body,
   wherein the first height dimension value h1 and the second height dimension value h2 correspond to heights of top surfaces of the respective structures from a reference base.

2. The apparatus of claim 1, wherein the second height dimension value h2 is ½ of the first height dimension value h1.

3. The apparatus of claim 1, wherein multiple of the plurality of electrodes are alignment electrodes, each having the second height dimension value h2.

4. The apparatus of claim 1, wherein the resonant body has a vibratory mode characterized by in-plane mode anti-node locations and out-of-plane mode anti-node locations on the resonant body and wherein the at least one alignment electrode is disposed at a location about the exterior perimeter of the resonant body where an in-plane mode antinode location and an out-of-plane mode anti-node location coincide.

5. The apparatus of claim 4, wherein multiple of the plurality of electrodes are alignment electrodes, each having the second height dimension value h2 and wherein each of the multiple alignment electrode is disposed at a location about the exterior perimeter of the resonant body where an in-plane mode antinode location and an out-of-plane mode anti-node location coincide.

6. The apparatus of claim 3, wherein the exterior perimeter surface of the resonant body is substantially circular in shape.

7. The apparatus of claim 6, wherein pairs of the multiple alignment electrodes are disposed opposite one another about the circular perimeter of the resonant body.

8. An apparatus comprising:
   a resonant body defined by a first height dimension value h1 and an exterior perimeter, the resonant body having a vibratory mode characterized by a plurality of in-plane mode anti-node locations and a plurality of out-of-plane mode anti-node locations on the resonant body; and
   at least one electrode disposed at a location about the exterior perimeter of the resonant body where an in-plane mode antinode location and an out-of-plane mode anti-node location coincide,
   wherein the at least one electrode is an alignment electrode.

9. The apparatus of claim 8, wherein the at least one alignment electrode has a second height dimension value h2 that is ½ of the first height dimension h1.

10. The apparatus of claim 9, wherein a plurality of electrodes are disposed adjacent the exterior perimeter surface of the resonant body.

11. The apparatus of claim 10, wherein multiple of the plurality of electrodes are alignment electrodes.

12. The apparatus of claim 11, wherein each of the multiple alignment electrodes is of the second height dimension value h2.

13. The apparatus of claim 12, wherein the second height dimension value h2 is approximately ½ of the first height dimension value h1.

14. The apparatus of claim 11, wherein each of the multiple alignment electrode is disposed at a location about the exterior perimeter of the resonant body where an in-plane mode antinode location and an out-of-plane mode anti-node location coincide.

15. A method of making a MEMS apparatus, comprising:
   A) forming a resonant body having a first height dimension value h1 and an exterior perimeter surface; and B) disposing at least one electrode adjacent the exterior perimeter surface of the resonant body,
wherein the at least one of the electrodes is an alignment electrode and has a second height dimension value h2 that is less than the first height dimension value h1 of the resonant body,
wherein the first height dimension value h1 and the second height dimension value h2 correspond to heights of top surfaces of the respective structures from a reference base.

16. The method of claim 15, wherein B) comprises:
B1) forming the at least one electrode to have the second height dimension value h2 be approximately ½ of the first height dimension value h1 of the resonant body.

17. The method of claim 15, wherein B) comprises:
B1) forming a plurality of electrodes disposed adjacent the exterior perimeter surface of the resonant body.

18. The method of claim 17, wherein B1) comprises:
B1a) forming the plurality of electrodes to have a second height dimension value h2 that is less than the first height dimension value h1 of the resonant body.

19. The method of claim 17, wherein the exterior perimeter surface of the resonant body is substantially circular in shape and wherein B1) comprises:
B1a) forming the plurality of electrodes in pairs disposed opposite one another about the circular exterior perimeter surface of the resonant body.

20. A gyroscope, comprising:
a resonant body having a first height dimension value h1 and an exterior perimeter surface, the resonant body having a vibratory mode characterized by a plurality of in-plane mode anti-node locations and a plurality of out-of-plane mode anti-node locations on the resonant body;
an opening defined in the resonant body;
a first plurality of side electrodes disposed adjacent the resonant body, each side electrode having a same height as the first height dimension value h1;
at least one alignment electrode disposed adjacent the resonant body at a location where an in-plane mode antinode location and an out-of-plane mode antinode location coincide,
wherein the at least one alignment electrode has a second height dimension value h2 that is less than the first height dimension value h1.

21. The gyroscope of claim 20, wherein the at least one alignment electrode is disposed adjacent the exterior perimeter surface.

22. The gyroscope of claim 20, wherein the at least one alignment electrode is disposed within the opening of the resonant body.

23. The gyroscope of claim 20, wherein the second height dimension value $h2=0.5*h1$.

24. The gyroscope of claim 20, wherein the resonant body is a planar resonant body.

25. The gyroscope of claim 20, wherein the plurality of side electrodes are disposed at the exterior perimeter surface of the resonant body.

* * * * *